US007338019B2

(12) United States Patent
Liu et al.

(10) Patent No.: US 7,338,019 B2
(45) Date of Patent: Mar. 4, 2008

(54) ADJUSTING ASSEMBLY FOR LCD MONITOR

(75) Inventors: Alvin (Chien-Chung) Liu, Tu-Chen (TW); Chen Lu Fan, Tu-Chen (TW); Li-Ping Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 246 days.

(21) Appl. No.: 10/912,489

(22) Filed: Aug. 4, 2004

(65) Prior Publication Data

US 2005/0029424 A1    Feb. 10, 2005

(30) Foreign Application Priority Data

Aug. 6, 2003    (TW)    .............................. 92214289 U

(51) Int. Cl.
*A47F 5/00*    (2006.01)
*A47F 7/00*    (2006.01)
*F16M 11/00*    (2006.01)

(52) U.S. Cl. ................. 248/123.11; 248/921; 248/923; 361/681

(58) Field of Classification Search ................ 248/676, 248/123.11, 372.1, 176.3, 920–923, 371, 248/183.1, 292.11; 474/205, 148, 156, 201; 361/681; 396/419

See application file for complete search history.

(56) References Cited

U.S. PATENT DOCUMENTS

| 2,584,921 | A | * | 2/1952 | Rawnsley et al. ............. 74/592 |
|---|---|---|---|---|
| 3,820,752 | A | * | 6/1974 | Oram ....................... 248/284.1 |
| 3,874,309 | A | * | 4/1975 | Cowley ........................... 108/2 |
| 4,500,251 | A | * | 2/1985 | Kiryu et al. ................. 414/719 |
| 4,545,555 | A | * | 10/1985 | Koch ..................... 248/280.11 |
| 4,834,329 | A | * | 5/1989 | Delapp ..................... 248/183.3 |
| 4,989,813 | A | * | 2/1991 | Kim et al. ................ 248/184.1 |
| 5,123,621 | A | * | 6/1992 | Gates ..................... 248/281.11 |
| 5,538,214 | A | * | 7/1996 | Sinila ....................... 248/278.1 |
| 5,812,368 | A | * | 9/1998 | Chen et al. ................. 361/681 |
| 5,947,429 | A | * | 9/1999 | Sweere et al. ......... 248/123.11 |
| 6,018,847 | A | * | 2/2000 | Lu ................................ 16/337 |
| 6,173,933 | B1 | * | 1/2001 | Whiteside et al. ....... 248/276.1 |
| 6,288,891 | B1 | * | 9/2001 | Hasegawa et al. .......... 361/681 |

(Continued)

FOREIGN PATENT DOCUMENTS

TW    467294    11/1998

(Continued)

*Primary Examiner*—Carl D. Friedman
*Assistant Examiner*—Michael McDuffie
(74) *Attorney, Agent, or Firm*—Wei Te Chung

(57) ABSTRACT

An adjusting assembly for adjustably connecting a monitor (50) to a base (60), includes a first rotate assembly (10) connected with the base, a second rotate assembly (20) connected with the monitor, a support arm (30) connected with the first rotate assembly and the second rotate assembly, and a pair of transmission straps (80). The transmission straps alter the rotation of the first rotate assembly in one direction to the rotation of the second assembly in an opposite direction. The first rotate assembly generates a first torsional moment. The monitor generates a first gravity moment opposite to the first torsional moment. When the monitor rotates relative to the support arm, the first rotate assembly generates a second torsional moment to counteract a second gravity moment of the monitor relative to the support arm.

20 Claims, 7 Drawing Sheets

U.S. PATENT DOCUMENTS

| | | | |
|---|---|---|---|
| 6,378,829 B1 * | 4/2002 | Strater et al. | 248/276.1 |
| 6,464,185 B1 * | 10/2002 | Minelli et al. | 248/183.1 |
| 6,561,469 B1 * | 5/2003 | Masuda et al. | 248/163.1 |
| 6,657,853 B2 * | 12/2003 | Oba et al. | 361/681 |
| 6,695,274 B1 * | 2/2004 | Chiu | 248/371 |
| 6,698,063 B2 * | 3/2004 | Kim et al. | 16/337 |
| 6,705,773 B2 * | 3/2004 | Fix | 396/419 |
| 2001/0014637 A1 * | 8/2001 | Miyaji | 474/250 |
| 2002/0068985 A1 * | 6/2002 | Oba et al. | 700/83 |
| 2003/0083168 A1 * | 5/2003 | Cipollone | 474/260 |

FOREIGN PATENT DOCUMENTS

| | | |
|---|---|---|
| TW | 530959 | 12/2001 |
| TW | 534420 | 5/2003 |

* cited by examiner

ADJUSTING ASSEMBLY FOR LCD MONITOR

BACKGROUND OF THE INVENTION

1. Field of the Invention

The present invention relates to an adjusting assembly, and particularly to an adjusting assembly which can adjust a height and an obliquity of an Liquid Crystal Display (LCD) monitor synchronously. The instant application relates to a contemporarily filed application titled "MONITOR ADJUSTING APPARATUS" and having the same applicants and the assignee with the instant application.

2. Description of Related Art

A conventional monitor is a Cathode Ray Tub (CRT) monitor whose volume and weight are large. The CRT monitor itself can't adjust a height and an obliquity, or can adjust an obliquity only. When a proper height and an obliquity are both required, the user needs to adjust a height and an obliquity of a computer desk bearing the CRT monitor. It is required to provide an assembly for a monitor to adjust a height and an obliquity synchronously.

Taiwan Patent Nos. 467294, 530959, 534420 disclose a kind of adjusting assembly of an LCD monitor designed to meet the above need. This kind of LCD monitor is rotatably secured to a support arm. The support arm is rotatably secured to a base. By adjusting the adjusting assembly, a height and an obliquity of the LCD monitor can be adjusted. However, when adjusting the height of the LCD monitor, the obliquity adjusted will also change. Thus, a correct obliquity needs to be adjusted again, which is unduly cumbersome and time consuming.

An improved adjusting assembly for an LCD monitor which overcomes the above-mentioned problems is desired.

BRIEF SUMMARY OF THE INVENTION

Accordingly, an object of the present invention is to provide an adjusting assembly which can stably and smoothly adjusting the height and the obliquity of an LCD monitor Another object of the present invention is to provide an adjusting assembly, in which the height and the obliquity of the LCD monitor can be adjusted synchronously.

To achieve the above-mentioned object, an adjusting assembly for adjustably connecting a monitor to a base, comprises a first rotate assembly connected with the base, a second rotate assembly connected with the monitor, a support arm connected with the first rotate assembly and the second rotate assembly, and a pair of transmission straps. The transmission straps alter the rotation of the first rotate assembly in one direction to the rotation of the second assembly in an opposite direction. The first rotate assembly generates a first torsional moment. The monitor generates a first gravity moment opposite to the first torsional moment. When the monitor rotates relative to the support arm, the first rotate assembly generates a second torsional moment to counteract a second gravity moment of the monitor relative to the support arm.

Other objects, advantages and novel features of the present invention will be drawn from the following detailed description of a preferred embodiment of the present invention with the attached drawings, in which:

DETAILED DESCRIPTION OF THE INVENTION

Figure 1:
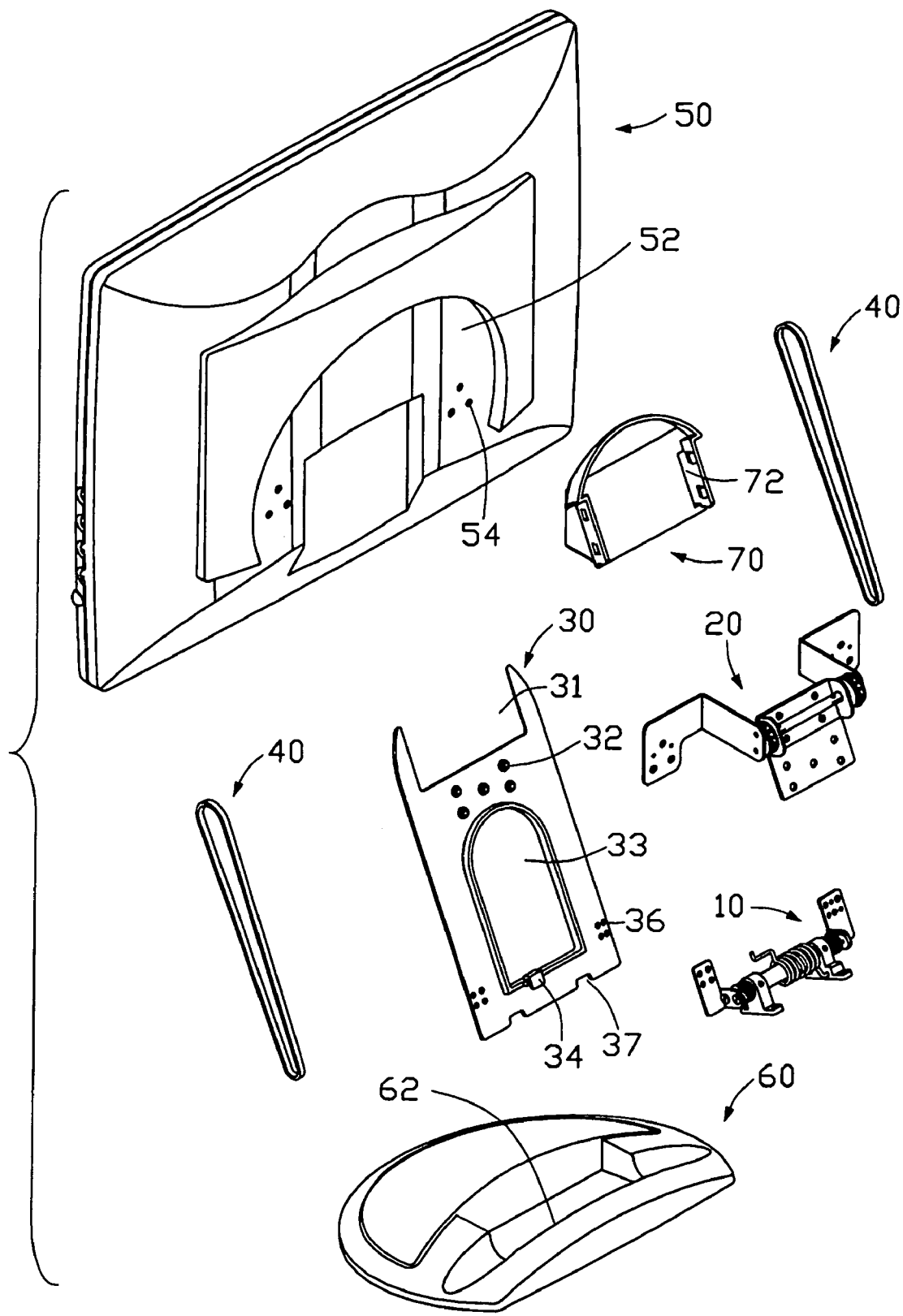
FIG. 1 is an exploded, isometric view of an adjusting assembly in accordance with the present invention, together with a monitor and a base.

Referring to FIG. 1, an adjusting assembly in accordance with the present invention is connected to a base 60, and used for adjustably supporting a monitor 50. The adjusting assembly is positioned between the monitor 50 and the base 60 for adjusting an obliquity and a height of the monitor 50 relative to the base 60.

A recess 52 is defined in a back of the monitor 50. A plurality of threaded holes 54 is defined in the recess. A groove 62 is located in a rear portion of the base 60, and a plurality of locking holes (not invisible) is defined in the groove 62. The adjusting assembly comprises a support arm 30, a first rotate assembly 10 rotatably connecting the support arm 30 and the base 60, a second rotate assembly 20 rotatably connecting the LCD monitor 50 and the support arm 30, and two continuous transmission straps 40.

The support arm 30 has a generally U shape. A bigger cutout 31 is defined in a top of the support arm 30. Two smaller cutouts 37 are defined in a bottom of the support arm 30. An opening 33 is defined in the support arm 30 between the bigger cutout 31 and the smaller cutouts 37. A clasp 34 is formed outwardly at a bottom of the opening 33. A plurality of bigger screw seats 32 is formed in the support arm 30 between the bigger cutout 31 and the opening 33. Two sets of smaller screw seats 36 are formed adjacent to the bottom of the opening 33 at two opposite sides.

Figure 2:
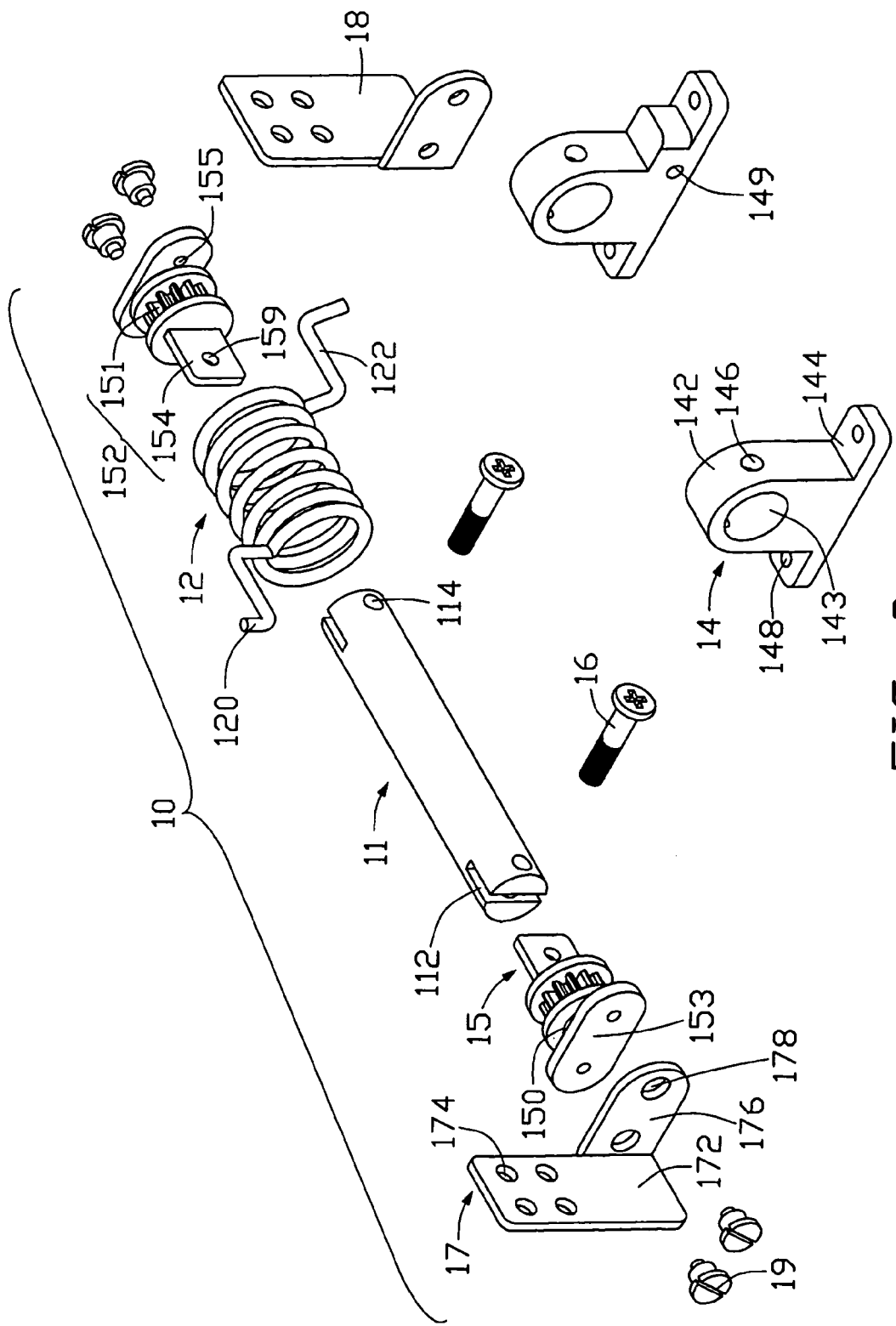
FIG. 2 is an exploded, isometric view of a first rotate assembly of the adjusting assembly of FIG. 1.
Figure 3:
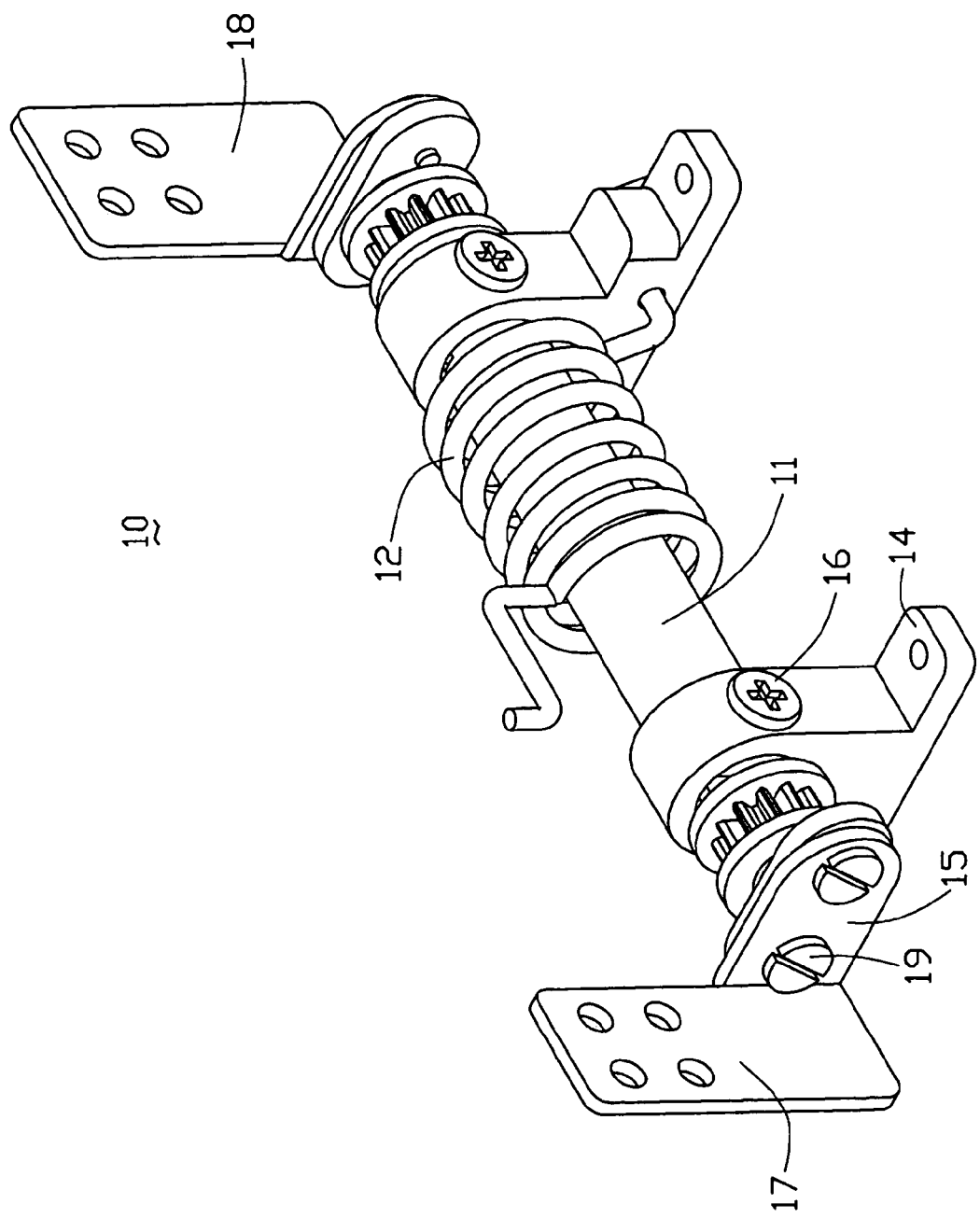
FIG. 3 is an assembled view of FIG. 2.

Referring to FIGS. 2 and 3, the first rotate assembly 10 comprises a first shaft 11, a torque-limiting spring 12, a pair of first dampers 15, a pair of first fixing boards 17, 18, and a pair of support seats 14.

The first shaft 11 defines two grooves 112 at two distal ends along an axial direction respectively. A pair of locking apertures 114 is defined across the first shaft 11 and respectively communicates with the grooves 112.

The torque-limiting spring 12 is set around the first shaft 11 and can generate a torque moment under an applied force. The torque-limiting spring 12 comprises two clasp arms 120, 122.

Each first damper 15 comprises a body 150 and a position portion 152 extending from one end of the body 150. The body 150 and the position portion 152 can rotate relative to each other. A mounting panel 153 defining two mounting holes 155 is formed at the other end of the body 150. The position portion 152 comprises a holding portion 151 and a first positioning post 154 extends from the holding portion 151 corresponding to the groove 112 of the first shaft 11. A plurality of gears (not labeled) is formed on a surface of the holding portion 151. A through hole 159 is defined in the first positioning post 154, corresponding to the locking aperture 114 of the shaft 11.

The first fixing boards 17, 18 each comprise a locking portion 172 and a mounting portion 176 bent vertically from an end of the locking portion 172. A plurality of fastening holes 174 is defined in the locking portion 172, corresponding to the smaller screw seats 36 of the support arm 30. Two mounting holes 178 are defined in the mounting portion 176, corresponding to the mounting holes 155 of the mounting panel 153 of the first damper 15.

The support seats 14 are to be assembled on the base 60. Each support seat 14 is general T-shaped, and comprises a base portion 144 defining a pair of aligning holes 148 therein, and a main body 142 extending upwardly from the base portion 144 defining an assembly hole 143 therein. A fixing hole 146 is defined in the main body 142 perpendicularly communicating with the assembly hole 143. The base portion 144 of one of the support seats 14 defines a retaining hole 149 perpendicular to the aligning hole 148, for retaining the clasp arm 122 of the torque-limiting spring 12.

In assembling the first rotate assembly 10, the torque-limiting spring 12 is set around the first shaft 11. Then each end of the first shaft 11 is inserted into the assembly hole 143 of the corresponding supporting seat 14. The first positioning post 154 of each first damper 15 is inserted into the groove 112 of the first shaft 11. The through hole 159 of each first positioning post 154 should be in alignment with the corresponding locking aperture 114 of the first shaft 11 and the fixing hole 146 of the corresponding supporting seat 14. A screw 16 extends through the locking hole 146, the locking aperture 114, and the through hole 159 in turn to assemble the first shaft 11, the torque-limiting spring 12, the first dampers 15 and the supporting seats 14 together, with the clasp arm 122 of the torque-limiting spring 12 retained in the retaining hole 149 of the corresponding supporting seat 14. Two screws 19 extend through the mounting holes 178 of each of the fixing boards 17, 18 and the mounting holes 155 of the corresponding mounting panel 153 of the first dampers 15 to secure the fixing boards 17, 18 to the first dampers 15.

Figure 4:
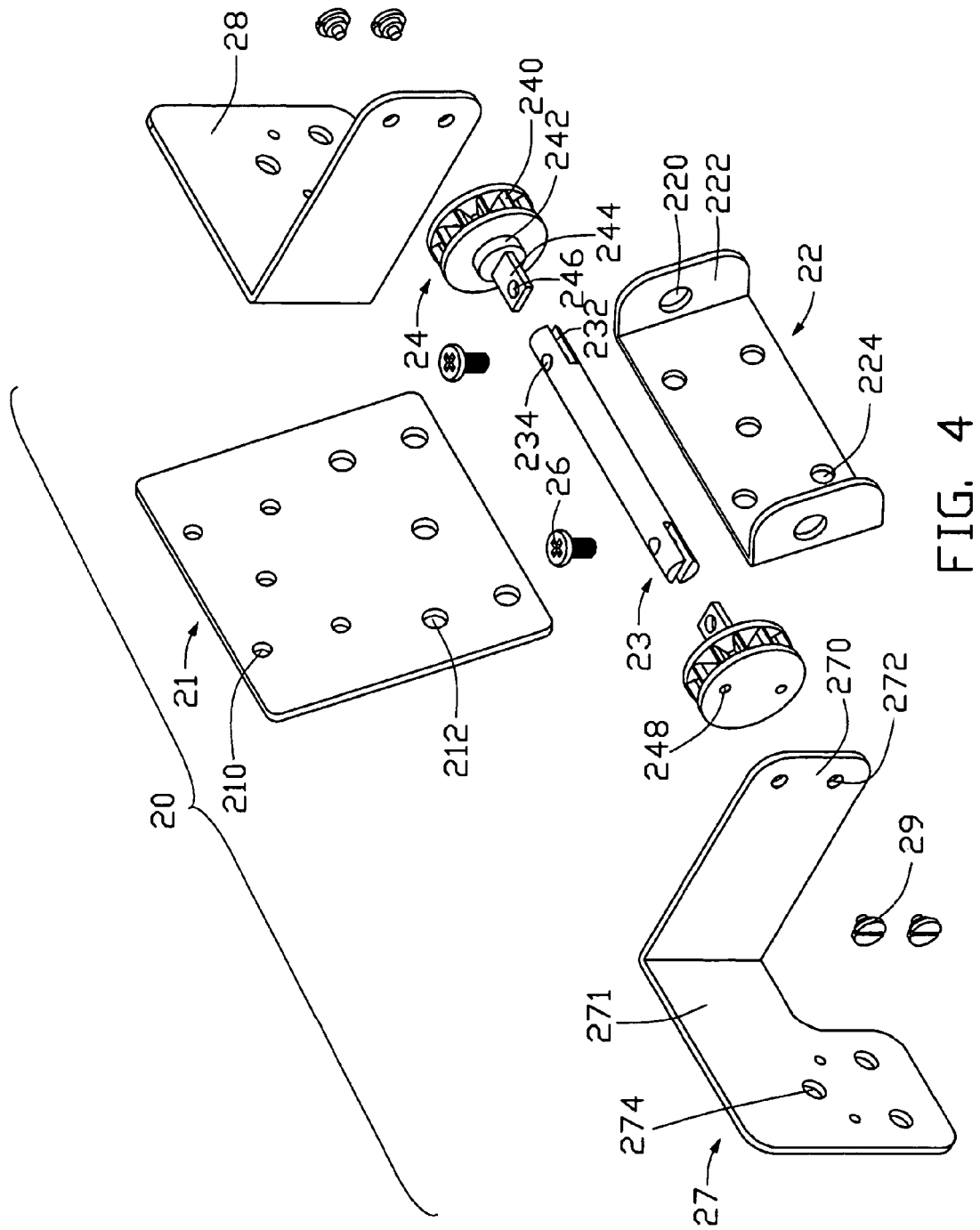
FIG. 4 is an exploded, isometric view of a second rotate assembly of the adjusting assembly of FIG. 1.
Figure 5:
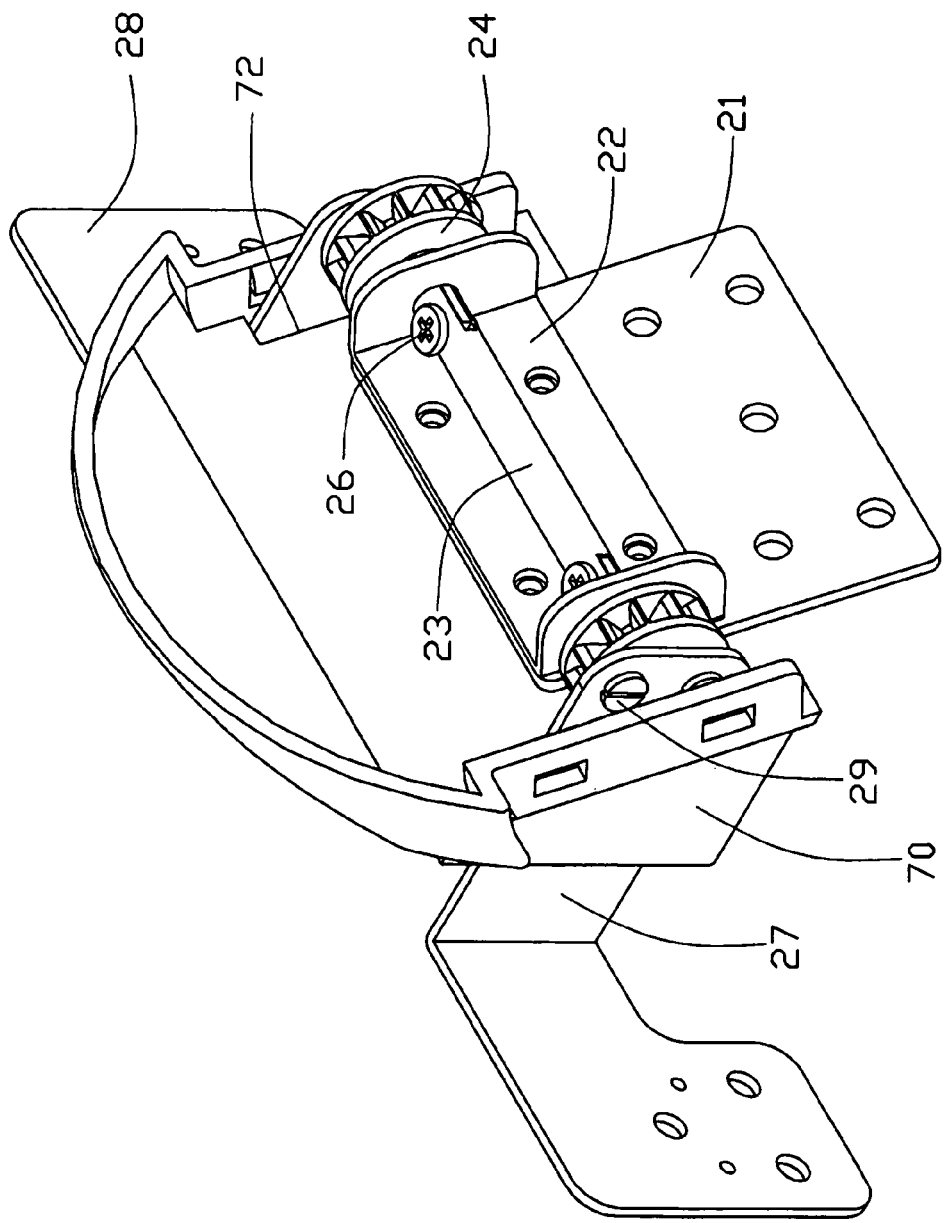
FIG. 5 is an assembled view of FIG. 4, together with a protecting cover.

Referring to FIGS. 4 and 5, the second rotate assembly 20 comprises a second shaft 23, a pair of second dampers 24, a pair of second fixing boards 27, 28, a support board 21 and a support shelf 22.

The second shaft 23 defines two grooves 232 at two distal ends along an axial direction respectively. A pair of locking apertures 234 is defined across the second shaft 23 and respectively communicates with the grooves 232.

The second dampers 24 comprises a body 240 and a position portion 242 extending from one end of the body 240. The body 240 (and the position portion 242 can rotate relatively to each other. A plurality of gears (not labeled) is formed on a surface of the body 240. A mounting panel (not labeled) defining two mounting holes 248 is formed at the other end of the body 240. A second position post 244 extends from the position portion 242, corresponding to the groove 232 of the second shaft 23. A through hole 246 is defined in the second position post 244, corresponding to the locking aperture 234 of the second shaft 23. The body 240 of each second damper 24 has a larger diameter than the holding portion of each first damper 15.

The second fixing boards 27, 28 each comprise a locking portion 271, and a mounting portion 270 bent vertically from an end of the locking portion 271. A plurality of fastening holes 274 is defined in the locking portion 271, corresponding to the threaded holes of the LCD monitor. Two mounting holes 272 are defined in the mounting portion 270, corresponding to the mounting holes 248 of the mounting panel of the second damper 24.

The support board 21 defines a plurality of mounting holes 210, and a plurality through holes 212 corresponding to the screw seats 32 of the support arm 30.

The support shelf 22 is made from a metal sheet. Two flanges 220 are bent vertically therefrom toward a same direction. A plurality of mounting holes 224 is defined in the support shelf 22, corresponding to the mounting holes 210 of the support sheet 21. An assembly hole 222 is defined in each flange 220 of the support shelf 22, corresponding to the second shaft 23.

In assembling the second rotate assembly 20, each end of the second shaft 11 is inserted into the corresponding assembly hole 222 of the support shelf 22. The second position post 244 of each second damper 24 is inserted into the groove 232 of the second shaft 23. The through hole 246 of the second position post 244 should be in an alignment with the corresponding locking aperture 234 of the second shaft 23. A screw 26 extends through the locking aperture 234, and the through hole 246 in turn to assemble the second shaft 23, the second dampers 24 and the support shelf 22 together. The mounting portion 270 of each second fixing board 27 extends through a through slot 72 of a protecting cover 70, then two screws 29 extend through the mounting holes 272 of the mounting portions 270 and engage in the mounting holes 248 of the corresponding second damper 24 thereby securing the second fixing boards 27, 28 to the second dampers 24. The support board 21 is secured to the support shelf 22 via screws extending the mounting holes 210 of the support board 21 and the mounting holes 224 of the support shelf 22.

Figure 6:
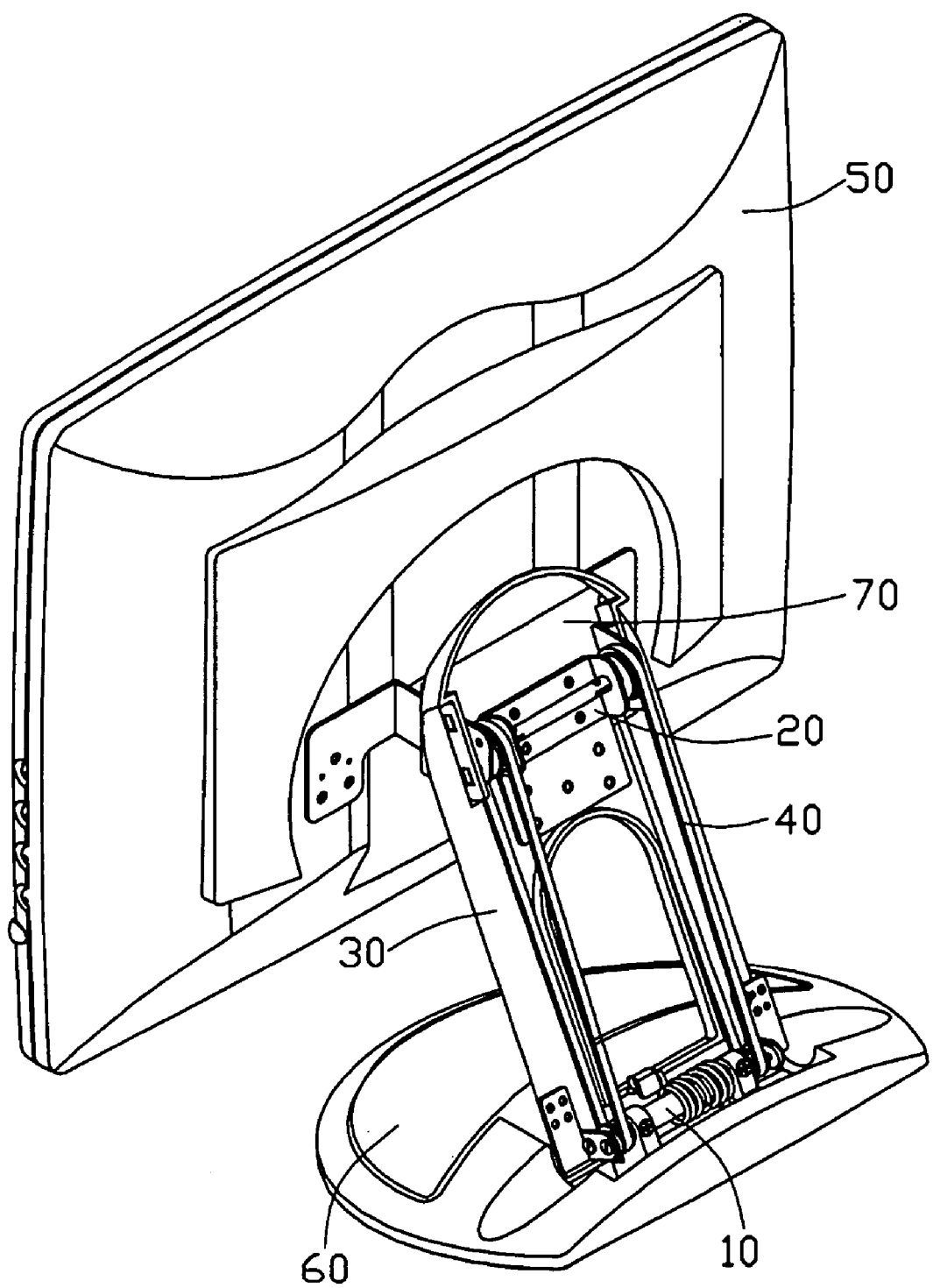
FIG. 6 is an assembled view of FIG. 1.

Referring also to FIG. 6, the transmission straps 40 can alter a rotation from a direction to a contrary direction.

In assembling the adjusting assembly, a plurality of screws extends through the through holes 212 of the support board 21 and engages with the screw seats 32 of the support arm 30, to secure the second rotate assembly 20 to the support arm 30. One end of the continuous transmission strap 40 is set around the gears of the corresponding first damper 15, and the other end of the continuous transmission strap 40 is set around the gears of the body 150 of the corresponding second damper 24. A plurality of screws extends through the fastening holes 174 of the first fixing boards 17, 18 and engages with the screw seats 36 of the support arm 30, to secure the first rotate assembly 10 to the support arm 30, with the clasp arm 120 of the torque-limiting spring 12 engaging with the clasp 34 of the support arm 30. Each small cutout 37 is defined for avoiding interference of the main body 142 of the corresponding support seat 14 while the support arm 30 is rotated. Thus both the first rotate assembly 10 and the second rotate assembly 20, with the continuous transmission straps 40 are connected with the support arm 30 to compose the adjusting assembly.

The first rotate assembly 10 is secured to the base 60 by aligning the aligning holes 148 of the support seats 14 with the locking holes in the groove 62 of the base 60. Then, a plurality of screws extends through the fastening holes 274 of the fixing boards 27, 28 and engages with the threaded holes of the LCD monitor 50, to secure the second rotate assembly 20 to the LCD monitor 50. Thus, the LCD monitor 50 connects with the base 60 by the adjusting assembly.

Figure 7:
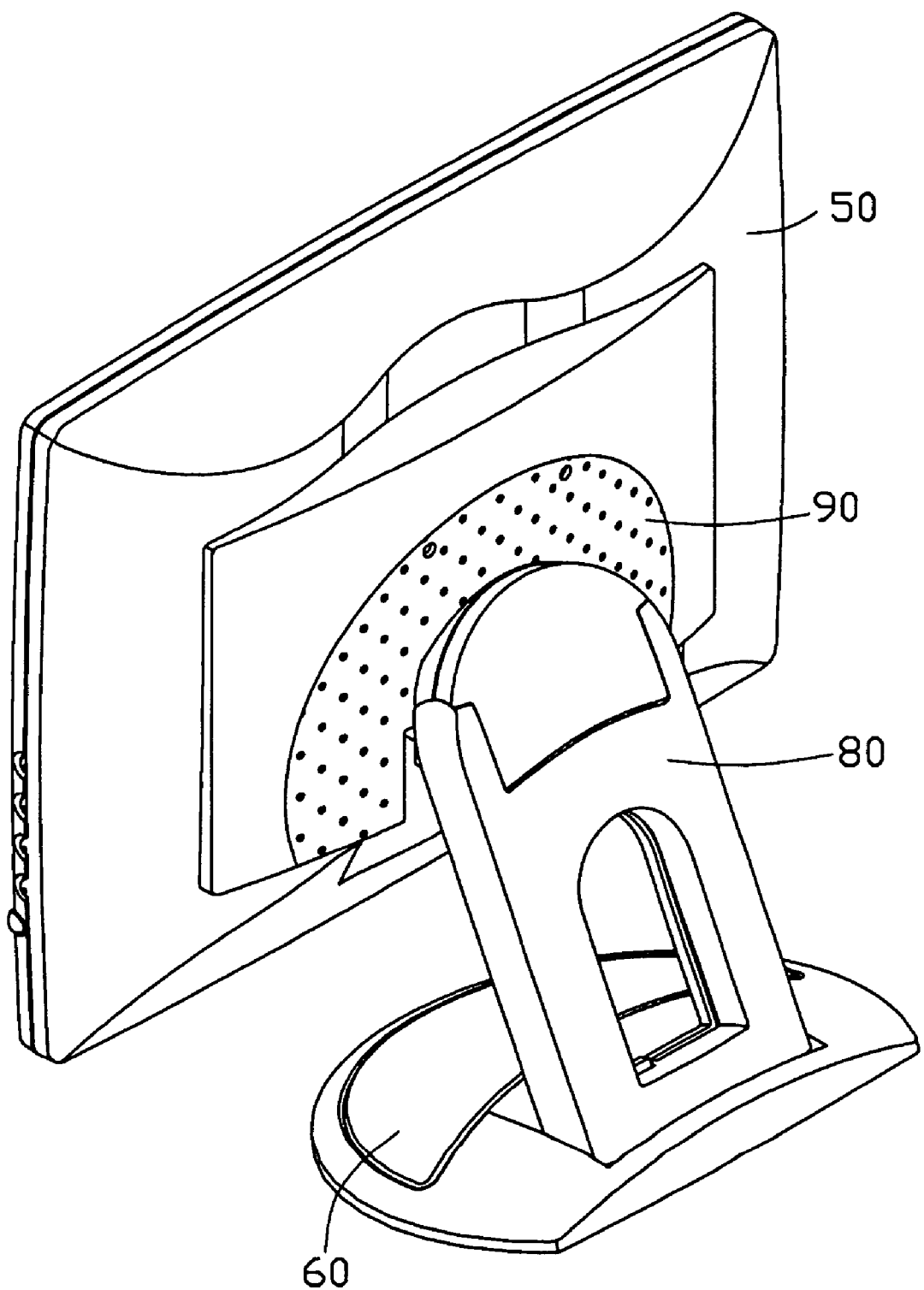
FIG. 7 is similar to FIG. 6, showing a plurality of decorating covers being attached to the adjusting assembly.

Referring also to FIG. 7, the adjusting assembly can be covered with decorating covers 80, 90 for ornamental and dustproof propose.

In adjusting the height and the obliquity of the LCD monitor 50 relative to the support base 60, a user can rotate the support arm 30. When the LCD monitor 50 is in a first balance position where the LCD monitor 50 has a proper obliquity to the user, the torque-limiting spring 12 generates a first torsional moment to counterpoise a first gravity moment of the LCD monitor 50 relative to the support arm 30. When a lower height of the LCD monitor 50 is required, the support arm 30 is rotated downwardly, with the LCD monitor 50 rotating downwardly. Meanwhile, the first fixing boards 17, 18 rotate downwardly together with the mounting panel 153 of the first damper 15 rotating in a first direction, and the transmission straps 40 drives the second dampers 24 to rotate in a contrary second direction. Because the diameters of the second dampers 24 are larger than the diameters of the first dampers 15, the rotation angle of the second dampers 24 in the second direction is smaller than the rotation angle of the first dampers 15 to assure the LCD monitor 50 rotates a little angle, for avoiding shake of the LCD monitor in the process of rotation. Thus, the LCD monitor 50 is in a second balance position with the LCD monitor 50 still has a proper obliquity to the user, and the torque-limiting spring 12 generates a second torsional moment to counterpoise a second gravity moment of the LCD monitor 50 relative to the support arm 30. In addition, wherever the LCD monitor 50 is, the torsional moment of the torque-limiting spring 12 equals to the gravity moment of the LCD monitor 50 relative to the support arm 30.

In addition, a hole or other structures can be defined in the support arm 30 to instead of the clasp 34 for retaining the clasp arm 120 of the torque-limiting spring 12 therein. The first rotate assembly 10, the second rotate assembly 20 can use a damper only respectively, with a transmission strap being used only. Thus, the damper is formed in the middle of the shaft thereon. The gears of the dampers' surface are designed to fit for the transmission strap for good friction. It can be understood that in an alternative embodiment, the holding portion 150 can be separated from the first positioning post 154, and thus could be actuated by rotation of mounting panel 153, to rotate successively due to the damper effect.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An adjusting assembly for adjustably connecting a monitor to a base, comprising:
   a first rotate assembly comprising a pair of support seats attached to the base, a first shaft mounted between the support seats, a torque-limiting spring set around the first shaft between the support seats with one clasp arm engaging with one of the support seat, and a pair of first fixing boards pivotally arranged at opposite ends of the first shaft;
   a second rotate assembly comprising a pair of second fixing boards attached to the monitor, a second shaft pivotally mounted between the second fixing boards, a support shelf pivotally mounted around the second shaft between the second fixing boards;
   a support arm mounted between the first rotate assembly and the second rotate assembly, the other clasp arm of the torque-limiting spring engaging with the support arm; and
   at least a transmission strap mounted to the first rotate assembly and the second rotate assembly configured for the rotation of the first rotate assembly in one direction to the rotation of the second rotate assembly in an opposite direction;
   wherein wherever the monitor is relative to the support arm, the monitor generates a gravity moment, and the torque-limiting spring generates a torsional moment to counteract the gravity moment.

2. The adjusting assembly as claimed in claim 1, wherein the first rotate assembly further comprises a pair of first dampers, each of the first dampers has a body, a holding portion and a first position post extending from one end of the holding portion, a mounting panel defining a mounting hole is formed on the other end of the body of the first dampers, a through hole is defined in each of the first position posts, and the adjusting assembly comprises a pair of transmission straps, with one end of each set around the holding portion of the corresponding first damper.

3. The adjusting assembly as claimed in claim 2, wherein the first shaft defines two grooves at two distal ends along an axial direction respectively, a pair of locking apertures is defined across the first shaft and respectively communicates with the grooves.

4. The adjusting assembly as claimed in claim 3, wherein each of the first fixing boards comprises a locking portion and a mounting portion bent vertically from an end of the locking portion.

5. The adjusting assembly as claimed in claim 4, wherein a plurality of screw seats is formed on the support arm, a plurality of fastening holes is defined in the locking portion of the corresponding first fixing board, corresponding to the screw seats of the support arm.

6. The adjusting assembly as claimed in claim 5, wherein the second rotate assembly further comprises a pair of second dampers, each of the second dampers has a body arid a second position post extending from one end of the body, a mounting panel defining a mounting hole is formed on the other end of each of the second dampers, a through hole is defined in each of the second position posts, and the other end of each of the transmission straps is set around the body of the corresponding second damper.

7. The adjusting assembly as claimed in claim 6, wherein the second shaft defines two grooves at two distal ends along an axial direction respectively, a pair of locking aperture is defined across the second shaft and respectively communicates with the grooves.

8. The adjusting assembly as claimed in claim 7, wherein each of the second fixing boards comprises a locking portion and a mounting portion bent vertically from an end of the locking portion.

9. The adjusting assembly as claimed in claim 8, wherein a plurality of threaded holes is defined in a back of the monitor, a plurality of fastening holes is defined in each of the second fixing boards, corresponding to the threaded holes of the monitor.

10. The adjusting assembly as claimed in claim 1, wherein the second rotate assembly further comprises a support board secured to the support shelf, the support board defines a plurality of through holes, corresponding to a plurality of screw seats formed on the support arm.

11. The adjusting assembly as claimed in claim 1, wherein the second rotate assembly further comprises a protecting cover.

12. The adjusting assembly as claimed in claim 11, wherein the adjusting assembly comprises a plurality of decorating covers.

13. The adjusting assembly as claimed in claim 1, wherein the support arm forms a clasp for retaining said the other clasp arm of the torque-limiting spring.

14. The adjusting assembly as claimed in claim 6, wherein each of the first dampers and the second dampers has a circular body, and each of the bodies of the second dampers has a larger diameter than each of the holding portions of the first dampers.

15. A monitor comprising:
a lower rotation assembly defining a first pivotal axis and including a first positioning portion;
an upper rotation assembly defining a second pivotal axis parallel to said first pivotal axis and including a second positioning portion;
a looped strap frictionally wrapping around both said first positioning portion and said second positioning portion;
a connection structure pivotally connected between said lower rotation assembly and said upper rotation assembly;
an elastic member arranged between the lower rotation assembly and the connection structure; and
a display fixed with respect to the second positioning portion; wherein
when said connection structure is rotated about the first pivotal axis in one of a clockwise and a counterclockwise directions to a desired position, said display is actuated by the second positioning portion to rotate about the second pivotal axis in the other of said clockwise and said counterclockwise directions correspondingly via said strap, the connection structure is held in said, desired position by a force provided by the elastic member.

16. The monitor as claimed in claim 15, wherein said first positioning portion is fixed relative to the first pivotal axis while the second positioning portion is rotatable relative to the second pivotal axis.

17. The monitor as claimed in claim 15, further comprising a base, wherein the first positioning portion is fixed with respect to the base.

18. The monitor as claimed in claim 15, a viewing plane of the display is parallel to the second pivotal axis.

19. The monitor as claimed in claim 17, wherein the elastic member comprises a torque spring having two clasp arms, one of the clasp arms is attached to the base and the other one of the clasp arms is attached to the connection structure, and the connection structure is held in said desired position by a force provided by the spring.

20. The monitor as claimed in claim 16, wherein the second positioning portion comprises a damper having a body with a plurality of teeth formed therearound and a post extending from one end of the body and being fixed relative to the connection structure, the looped strap is set around the body which is fixed relative to the display and pivotable relative to the post.

* * * * *